UNITED STATES PATENT OFFICE.

NATHANIEL CHATER, OF NEW YORK, N. Y.

BLACK PIGMENT FROM ANTHRACITE COAL.

Specification forming part of Letters Patent No. 1,358, dated October 5, 1839.

*To all whom it may concern:*

Be it known that I, NATHANIEL CHATER, of the city and State of New York, have discovered and invented a new pigment which I call "Patent Black;" and I do hereby declare that the following is a full and exact description of the same.

It is intended as a substitute for ivory-black, and answers every purpose for which that article can be employed, but more brilliant in its hue, and infinitely cheaper. It is made from the anthracite coal, and may be reduced to powder either in its dry state, in oil, or in water in any description of mill. The method which I use to prepare the same is to grind it in water in either horizontal or edge stone mills, and to float it off into vats or pits, similar to the grinding of whiting, from which it is taken when subsided and dried for use. It may then be used for the making of black paint, printers' ink, blacking, or any other purpose for which either ivory or lamp black is now used.

What I claim as my invention, and desire to secure by Letters Patent, is—

The manufacturing of a black pigment from anthracite coal, in the manner herein set forth, or in any other substantially the same.

In testimony whereof I, the said NATHANIEL CHATER, hereto subscribe my name, in the presence of the witnesses whose names are hereunto subscribed, on the 12th day of June, A. D. 1839.

NATHL. CHATER.

Witnesses:
STEPHEN U. BEAUCHANT,
T. P. BALL.